(12) United States Patent
Cheng et al.

(10) Patent No.: US 11,409,107 B2
(45) Date of Patent: Aug. 9, 2022

(54) ULTRA-THIN OPTICAL COMPONENT, VIRTUAL IMAGING METHOD OF SAME OPTICAL COMPONENT, AND DISPLAY DEVICE USING SAME

(71) Applicant: Beijing NED+AR Display Technology Co., Ltd., Beijing (CN)

(72) Inventors: Dewen Cheng, Beijing (CN); Qichao Hou, Beijing (CN); Qiwei Wang, Beijing (CN)

(73) Assignee: BEIJING NED+AR DISPLAY TECHNOLOGY CO., LTD., Beijing (CN)

( * ) Notice: Subject to any disclaimer, the term of this patent is extended or adjusted under 35 U.S.C. 154(b) by 128 days.

(21) Appl. No.: 16/694,687

(22) Filed: Nov. 25, 2019

(65) Prior Publication Data

US 2020/0183167 A1    Jun. 11, 2020

(30) Foreign Application Priority Data

Dec. 5, 2018  (CN) .......................... 201811477484.3

(51) Int. Cl.
*G02B 27/01* (2006.01)
(52) U.S. Cl.
CPC ..... *G02B 27/0172* (2013.01); *G02B 27/0176* (2013.01); *G02B 2027/015* (2013.01); *G02B 2027/0123* (2013.01); *G02B 2027/0178* (2013.01)
(58) Field of Classification Search
CPC ............ G02B 27/0172; G02B 27/0176; G02B 2027/0123; G02B 2027/015; G02B 2027/0178; G02B 17/006; G02B 5/10; G02B 2207/123; G02B 27/0101; G02B 17/08; G02B 2027/0145
USPC ......................................... 359/633
See application file for complete search history.

(56) References Cited

U.S. PATENT DOCUMENTS

| 9,239,453 | B2 * | 1/2016 | Cheng .................. G02B 17/006 |
| 2017/0299866 | A1 * | 10/2017 | Smithwick ............. G02B 5/003 |
| 2018/0129112 | A1 * | 5/2018 | Osterhout ............ G02B 27/017 |
| 2021/0173199 | A1 * | 6/2021 | Suzuki ................. G02B 26/101 |

* cited by examiner

*Primary Examiner* — Thomas K Pham
*Assistant Examiner* — Henry A Duong
(74) *Attorney, Agent, or Firm* — Dragon Sun Law Firm, P.C; Jinggao Li, Esq.; Nathaniel Perkins

(57) ABSTRACT

The present invention provides an ultra-thin optical component, including a mirror projection device and a reflector, where the mirror projection device is configured to refract image light symmetrically, then form a real image, and project the real image to the reflector, where the real image is located between a human eye and the reflector; and the reflector is configured to reflect the image light to the human eye. The present invention further provides a display device using the ultra-thin optical component and a virtual imaging method. By means of the ultra-thin optical component, the display device, and the imaging method in the present invention, an optical component is made thinner and lighter, and an image source display device is easier to configure and package, to achieve the appearance of ordinary glasses.

20 Claims, 4 Drawing Sheets

ULTRA-THIN OPTICAL COMPONENT, VIRTUAL IMAGING METHOD OF SAME OPTICAL COMPONENT, AND DISPLAY DEVICE USING SAME

CROSS-REFERENCE TO RELATED PATENT APPLICATION

This application claims priority to and the benefit of CN 201811477484.3, filed Dec. 5, 2018, entitled "ULTRA-THIN OPTICAL COMPONENT, VIRTUAL IMAGING METHOD OF SAME OPTICAL COMPONENT, AND DISPLAY DEVICE USING SAME," by Dewen Cheng et al. The entire disclosure of the above-identified application is incorporated herein by reference.

Some references, which may include patents, patent applications, and various publications, are cited and discussed in the description of the present invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

BACKGROUND

Technical Field

The present invention includes an optical display module, and in particular, an ultra-thin optical component, a virtual imaging method, and a display device using same, applicable to the field of head-mounted display devices.

Related Art

In recent years, wearable virtual reality and augmented reality display devices have made great progress, and especially head-mounted display devices are more and more accepted and recognized by the majority of users due to their wide applications. A head-mounted display device is worn on the head of an observer and therefore needs to have a compact and lightweight structure. The users generally hope that such a display device may have the appearance of glasses similar to sunglasses usually used only for myopia correction or sun protection.

Therefore, thin lenses with thicknesses within a certain range are designed in various manners, for example, lenses in a head-mounted display device launched by the Meta company, and reflective lenses presented by the Rokid company in the Consumer Electronics Show (CES) 2018. However, inevitably, to both realize thin lenses and meet basic requirements of optical performance in a field of view, an exit pupil range, and an eyebox, there may be problems of size design, image source location placement, expected optical performance, and the like for the lenses, affecting the layout of the lenses.

Therefore, a heretofore unaddressed need exists in the art to address the aforementioned deficiencies and inadequacies.

SUMMARY

In view of this, the present invention provides an ultra-thin optical component, which does not affect optical performance and a hardware layout of a lens while achieving thinness of the lens.

To achieve the foregoing objective, technical solutions of the present invention are implemented as follows: An ultra-thin optical component is provided, including a mirror projection device and a reflector, where the mirror projection device is configured to refract image light symmetrically, then form a real image, and project the real image onto the reflector, where the real image is located between a human eye and the reflector; and the reflector is configured to reflect the image light to the human eye.

Further, a bottom of the real image is higher than a path on which the image light reflected by an upper portion of the reflector is located.

Further, the mirror projection device is a micro-reflector array, an inverted image system, or a micro projection system.

Further, the reflector includes a primary mirror and an auxiliary mirror, and a reflective surface of the primary mirror is a free-form surface.

Further, the reflective surface is a continuously or non-continuously spliced free-form surface, and a focal length f of the primary mirror ranges from 15 mm to 25 mm.

Further, a minimum size of the mirror projection device does not exceed a space limited by a connection line of outlines of an upper edge and a lower edge of the reflector.

Further, the reflective surface is coated with or attached to a full-reflective film or a reflective film with a predetermined transmission-reflection ratio.

Further, in the reflector, the thickness of the primary mirror is 1 mm to 3 mm, and a thickness of the auxiliary mirror is 0.8 mm to 1.5 mm.

Further, a non-effective reflective surface of the reflector is extended to an area covering a size of an image source.

Further, outer surfaces of an auxiliary mirror and a primary mirror of the reflector are of different types, and a curvature difference between the two outer surfaces is adjusted, to adapt to different visual degrees of human eyes.

The present invention further provides a display device, including: a micro-image source, where the micro-image source is located on an upper portion of an ultra-thin optical component or a side close to a human eye, and is configured to emit image light, where the ultra-thin optical component is configured to refract the received image light symmetrically, then form an inverted image of the image light, and then reflect the image light to the human eye through a reflector; and a display device support, configured to support the micro-image source and the ultra-thin optical component.

The present invention further provides a virtual imaging method, where image light emitted by a micro-image source is incident to a mirror reflection device; the mirror reflection device receives the image light, and refracts the image light symmetrically between a human eye and a reflector, to form a real image; and the aggregated real image is further incident to the reflector, and the reflector refracts the image light to the human eye.

By means of the ultra-thin optical component and the display device described in the present invention, the mirror projection device refracts an image of the micro-image source symmetrically into a real image, and then refracts the real image to the human eye through the reflector, resolving the problems of easily blocking the sight of the human eye when the micro-image source is previously placed directly in a position of the real image, and a large package of the display device. A display device of the micro-image source may be mounted above or on a side of the reflector, to facilitate the layout and lightness of the display device. In addition, the reflector is designed thin and light, reducing the weight of the optical component, and the reflector may be extended along an outer edge until it obscures the micro-image source, giving it the appearance of ordinary glasses. Alternatively, the extended shape of the reflector may be designed into a required shape, to achieve individuality and uniqueness. In addition, the ultra-thin optical component and the display device described in the present invention can adapt to people with different visual degrees according to a curvature difference of lenses, expanding a use range of users.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

DETAILED DESCRIPTION

The following describes the present invention in detail by using specific embodiments and the accompanying drawings.

An optical component described in the present invention may be applied to a structure of two eyes or a single eye. In the structure of two eyes, optical components corresponding to the left and right eyes are the same. For ease of description, in the present invention, the optical component corresponding to the single eye is used as an example for description.

Figure 1:
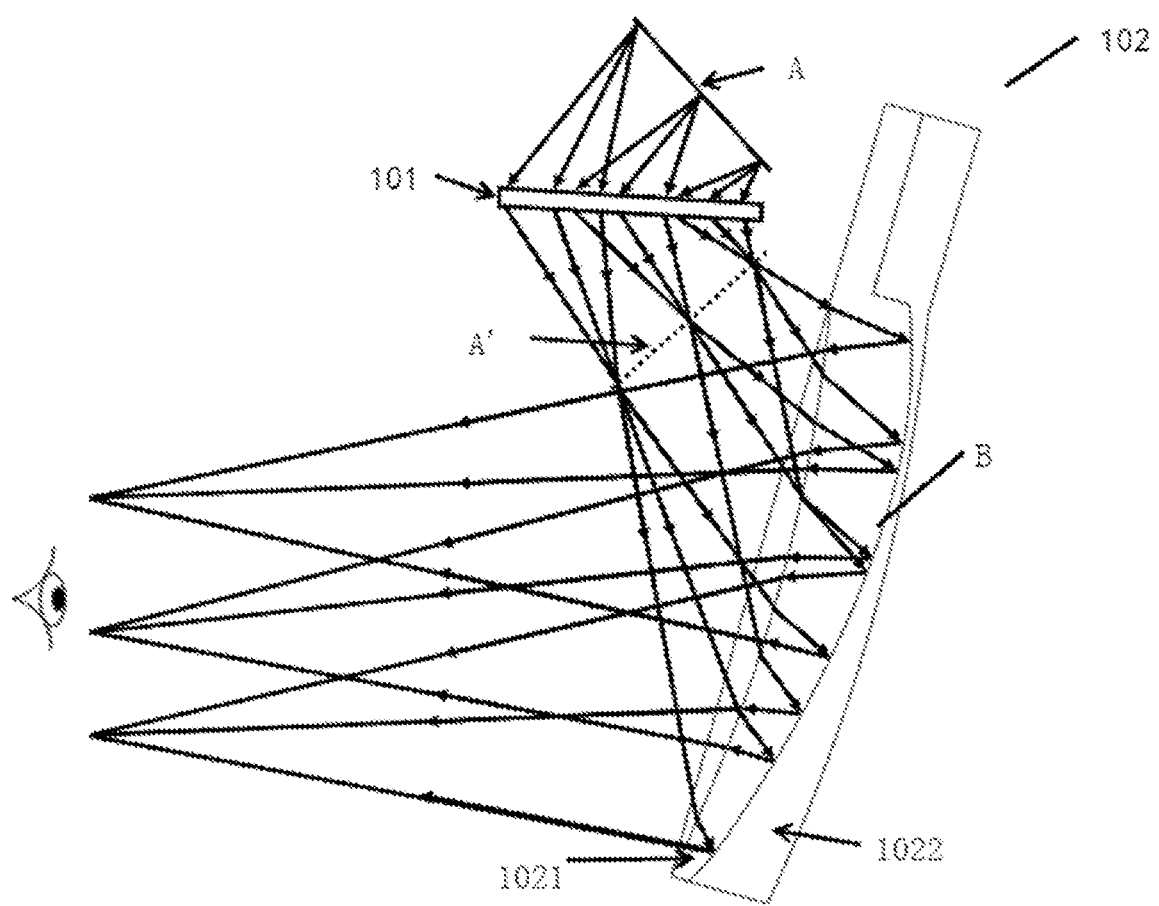
FIG. 1 is a schematic cross-sectional structural diagram of an ultra-thin optical component.

A schematic structure of an ultra-thin optical component according to the present invention is shown in FIG. 1, which is a cross-sectional diagram of an optical component, including a mirror projection device 101 and a reflector 102.

The mirror projection device 101 symmetrically refracts light emitted by an image source A towards a direction of the reflector. The symmetrical refraction means that the light of the image source A incident to the mirror projection device 101 and exit light emitted by the mirror projection device 101 are symmetrical by using the mirror projection device 101 as an axis of symmetry. In other words, the image source A uses the mirror projection device as the axis of symmetry, to form an image source real image A' at a symmetrical position shown in FIG. 1. The bottom of the formed real image is higher than a path on which image light reflected by an edge of an upper portion of the reflector is located.

The reflector 102 fully reflects the incident image light to a human eye.

Specifically, the mirror projection device 101 may include a micro-reflector array, an inverted image system, or a relay system such as a micro projection system, provided that the system can symmetrically refract the image light by using the mirror projection device 101 as an axis of symmetry, to form the real image of the image source A through aggregation.

The reflector 102 shown in FIG. 1 includes a primary mirror 1021 and an auxiliary mirror 1022. A surface of the primary mirror 1021 close to the human eye is an outer surface, and a surface away from the human eye is an inner surface, or may be referred to as a reflective surface B. The outer surface is a concave surface, which may be spherical or aspherical, and the outer surface is formed into a continuous surface form, giving the reflector a uniform appearance. The reflective surface B is coated with or attached to, as required, a full-reflective film or a spectroscopic film with a predetermined transmission-reflection ratio. Such a design can reflect all or part of the image light incident to the reflective surface B to the human eye. A surface of the reflective surface B is spherical, aspherical, or a free-form surface. The image light is refracted through the outer surface of the primary mirror 1021 to enter the primary mirror, and propagates in the primary mirror to the reflective surface B. On the reflective surface B, the image light is reflected according to the law of reflection. The image light is reflected back to the primary mirror, and is refracted again to the human eye through the outer surface.

The auxiliary mirror 1022 and the primary mirror 1021 are glued or integrally formed, using a high-transmission optical material, to allow external light to pass through almost without loss. When the reflective surface B of the primary mirror has a predetermined transmission-reflection ratio, it may be applied to an AR device, so that the human eye can view the outside environment. A surface of the auxiliary mirror 1022 facing the environment side is an outer surface, and its surface shape may be or may not be consistent with that of the outer surface of the primary mirror 1021. When the outer surface of the auxiliary mirror and the outer surface of the primary mirror 1021 are in different shapes, a curvature difference between the two is adjusted, to adapt to human eyes with different visual degrees. A surface of the auxiliary mirror glued to or integrated with the primary mirror 1021 is an inner surface, and its surface shape is consistent with the reflective surface B.

Specifically, that the curvature difference adapts to human eyes with different visual degrees is implemented by using a formula of a relationship between a curvature and $$1/F = (N-1)*(1/R1 - 1/R2) + \frac{(N-1)^2 * T}{N*R1*R2}$$

the visual degree: D=1000/F; where R1 is a curvature radius of the outer surface of the primary mirror 1021, R2 is a curvature radius of the outer surface of the auxiliary mirror 1022, T is a thickness of the reflector 102, N is a material of the reflector 102, F is a focal length of the reflector 102, and D is the visual degree. Table 1 shows a design instance of curvature differences in six different cases, adapted to different visual degrees. A person skilled in the art should understand that, the protection scope of the present invention is not limited to the following embodiments:

TABLE 1

| R1 | T | N | R2 | D |
|---|---|---|---|---|
| −50 | 4 | 1.53 | −43.2 | +2D |
| −50 | 4 | 1.53 | −51.5 | 0 |
| −50 | 4 | 1.53 | −56.7 | −1D |
| −50 | 4 | 1.53 | −71.6 | −3D |
| −50 | 4 | 1.53 | −97.3 | −5D |
| −50 | 4 | 1.53 | −151.3 | −7D |

To make the image light reflected to the human eye clearer, preferably, a focal length f of the primary mirror 1021 in the reflector 102 ranges from 15 mm to 25 mm. A focal length of the auxiliary mirror may be set as required, to determine a focal length F of reflector. To effectively control a volume of an element right in front of the human eye, a maximum thickness of the primary mirror may be effectively controlled in a range of not more than 3 mm, and preferably not less than 1 mm for a strength need. Correspondingly, a thickness of the auxiliary mirror is 0.8 mm to 1.5 mm. Ranges of the curvature radius R1 and R2 are not limited, may be adjusted as required by visual degrees. Usually, a value of R1 is determined, and then a value of R2 is adjusted according to an individual requirement, to meet requirements of different visual degrees of human eyes.

In this implementation, preferably, the reflective surface B of the primary mirror is enabled to have a shape of a free-form surface, to obtain better image quality. This may be expressed by an XY polynomial, and a description equation thereof is as follows:

$$z = \frac{c(x^2 + y^2)}{1 + \text{sqrt}(1 - (1+k)c^2(x^2+y^2))} + \sum_{j=2}^{66} C_j x^m y^n.$$

where c is a curvature radius of a surface, k is a conic constant, and Ci is a polynomial coefficient.

Table 2 is an example in which the reflective surface B is a free-form surface. A person skilled in the art may understand that, the following table is only an embodiment meeting a condition, and is not used to limit the scope of the present invention.

TABLE 2

| | |
|---|---|
| Y radius | −78.17023048 |
| K | −2.312203278 |
| C4 | −0.005983926 |
| C6 | −0.00472037 |
| C8 | −2.54E−05 |
| C10 | −5.62E−05 |
| C11 | −3.44E−06 |
| C13 | −4.65E−06 |
| C15 | −4.53E−06 |
| C17 | 7.37E−08 |
| C19 | 1.74E−07 |
| C21 | 8.03E−07 |
| C22 | 2.35E−10 |
| C24 | −2.88E−09 |
| C26 | −1.20E−08 |
| C28 | 3.88E−08 |
| C30 | −3.14E−10 |
| C32 | −2.51E−10 |
| C34 | −3.31E−09 |
| C36 | −8.41E−09 |
| C37 | −3.03E−13 |
| C39 | −2.42E−11 |
| C41 | 1.44E−10 |
| C43 | −1.30E−10 |
| C45 | −2.54E−10 |
| C47 | 2.22E−14 |
| C49 | −3.47E−13 |
| C51 | 4.31E−12 |
| C53 | 1.27E−11 |
| C55 | 2.72E−11 |
| C56 | 1.81E−15 |
| C58 | 4.78E−14 |
| C60) | −2.26E−13 |
| C62 | −1.05E−13 |
| C64 | 5.20E−13 |
| C66 | 5.68E−13 |

Figure 2:
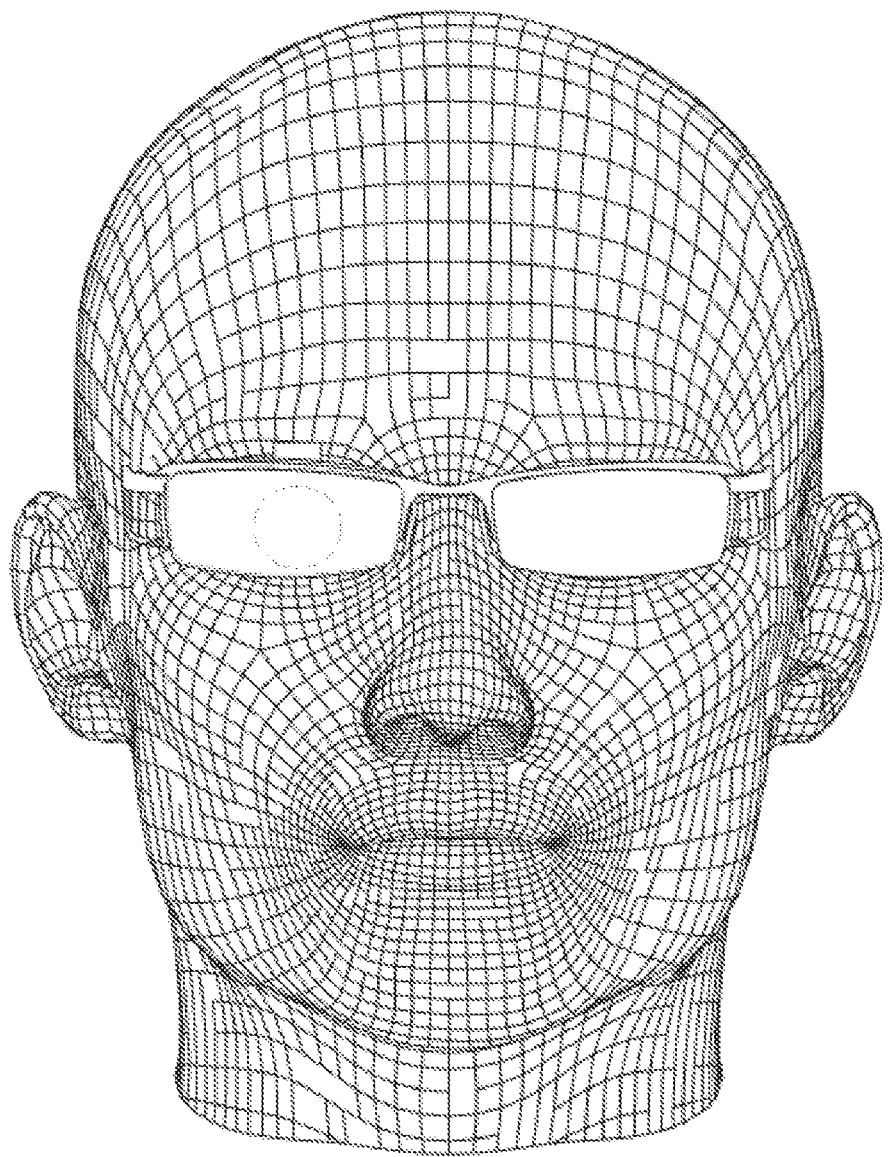
FIG. 2 is a front view of a display device using the ultra-thin optical component.
Figure 3:
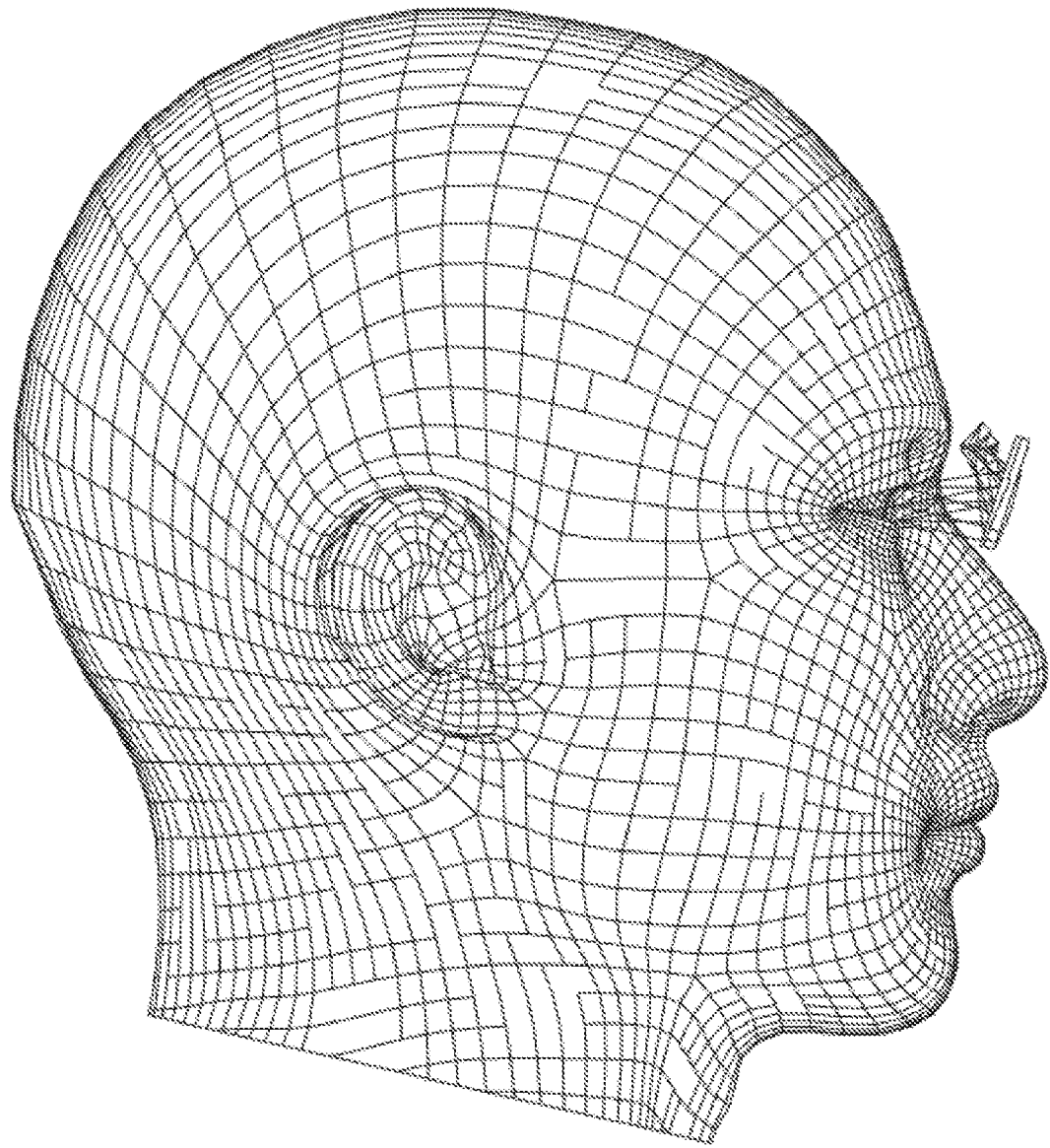
FIG. 3 is a left view of the display device using the ultra-thin optical component.
Figure 4:
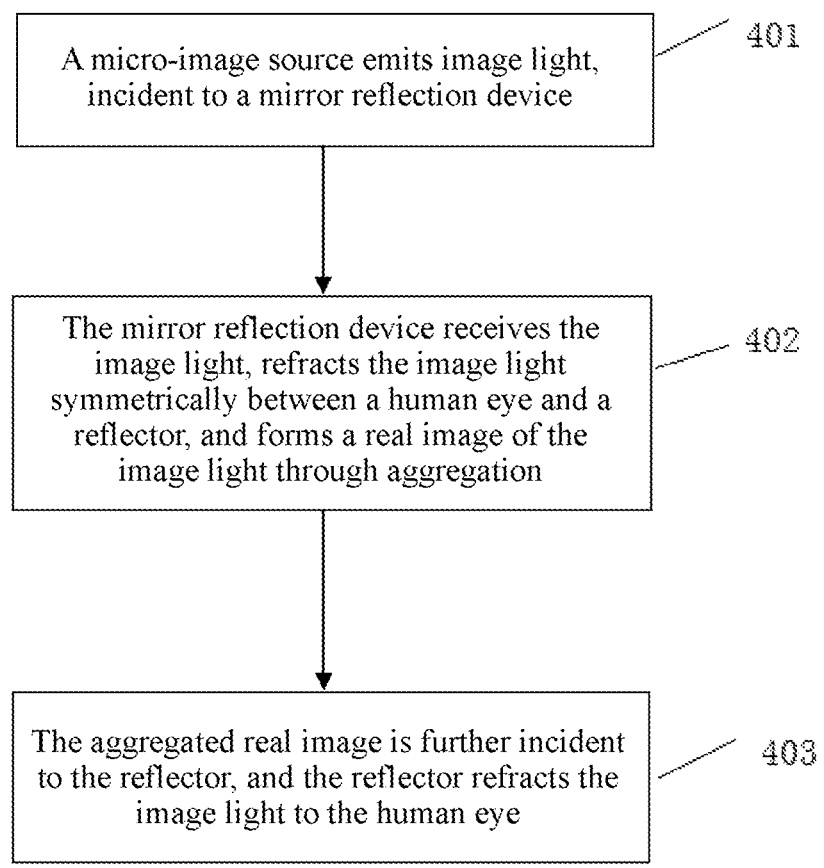
FIG. 4 is a schematic flowchart of a virtual imaging method.

As shown in FIG. 2 and the FIG. 3, for the use of projection to the human eye, the reflector 102 does not need an effective reflective surface area of the image light to be very large. However, the shape of the reflector 102 may be extended along its outer edge to a non-effective reflective surface. A range of the extension may be set as required, and its upper portion may exceed the image source, so that the reflector has the appearance of ordinary glasses for correcting defects of vision. The non-effective reflective surface area is a part on the reflective surface that does not receive the image light and reflects the image light.

Correspondingly, the present invention further provides a virtual imaging method, applicable to a near-eye display of a virtual image for a human eye, specifically including:

Step 401: A micro-image source emits image light, incident to a mirror reflection device.

Step 402: The mirror reflection device receives the image light, refracts the image light symmetrically between the human eye and a reflector, and forms a real image of the image light through aggregation.

Specifically, the micro-image source is located above the reflector or on a side close to the human eye. The mirror reflection device includes a micro-reflector array, an inverted image system, or a micro projection system. The real image formed by the mirror reflection device is located between the human eye and the reflector. Preferably, the bottom of the real image is higher than a path on which the image light reflected by an upper portion of the reflector is located.

Step 403: The aggregated real image is further incident to the reflector, and the reflector refracts the image light to the human eye.

A person skilled in the art may understand that, for the foregoing virtual imaging method, the reflector described in this embodiment of the present invention and used as an optical element directly placed right in front of the human eye is only an example. Any imaging method that can be implemented by using a real image of a non-physical image source that is placed in space is applicable to the foregoing virtual imaging method of the present invention. When near-eye display is used, the foregoing optical element is usually an optical mirror which has a curvature and is configured to magnify an image.

The present invention further provides a display device, including the ultra-thin optical component and the image source shown in FIG. 2 and FIG. 3 and a display device support (not shown), which may be, for example, a frame. The image source is a micro-image source. Preferably, the support is formed as the appearance of glasses, and may include a temple for ensuring a distance between a human eye and the reflector and a fixator for fixing relative positions of the reflector and a mirror projector. The temple and/or the fixator may further include an electronic element for driving the micro-image source.

The micro-image source is located on an upper portion of the ultra-thin optical component or a side close to the human eye, is configured to emit the image light, and may be an OLED, a micro-LED, a mini-LED, a back-light LCoS, or an LCD, or the like.

For a micro-image source that can be implemented as having exit image light with a predetermined polarization state, for example, an LCoS-type or LCD-type micro-image source is placed in the foregoing display device. Preferably, the reflective surface of the primary mirror of the ultra-thin optical component of the present invention is made to have a beam splitting layer matching the polarization state of the image light, and a matching manner may be optionally fully reflecting light consistent with the polarization state of the image light emitted by the image source, thereby greatly increasing light energy utilization during display of the micro-image source. However, not limited thereto, a case in which reflection efficiency of the image light with the polarization state can be dynamically adjusted is also applicable. For a micro-image source having exit image light without a predetermined polarization state, a similar alternative is implemented by using a directional spectroscopic film, to provide a reflection function for light incident from the inside of the primary mirror to the surface of the micro-image source, and provide a transmission function for light incident from the outside (that is, incident from a transmission direction) to the surface of the micro-image source, thereby increasing light energy utilization of the image light.

The foregoing descriptions are merely preferred embodiments of the present invention, and are not intended to limit the protection scope of the present invention. The present invention may be implemented in many different forms and should not be interpreted as limited to the embodiments described herein. Instead, these embodiments are provided to make the present disclosure sufficient and complete, and thoroughly convey the concept of the present invention to those skilled in the art. In addition, characteristics in the embodiments may also be combined in a manner other than the foregoing embodiments, and the combined technical solutions still fall within the scope of this application.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An ultra-thin optical component, comprising a mirror projection device and a reflector, wherein
   the mirror projection device is configured to refract image light directly and symmetrically from an image source to generate a real image of the image source, and directly project the real image onto the reflector, wherein the real image and the image source are symmetrical with the mirror projection device as the axis of symmetry, and the real image is located between a human eye and the reflector; and
   the reflector is configured to reflect the image light to the human eye.

2. The ultra-thin optical component according to claim 1, wherein a bottom of the real image is higher than a path on which the image light reflected by an upper portion of the reflector is located.

3. The ultra-thin optical component according to claim 2, wherein the mirror projection device is a micro-reflector array, an inverted image system, or a micro projection system.

4. The ultra-thin optical component according to claim 3, wherein the reflector comprises a primary mirror and an auxiliary mirror, and a reflective surface of the primary mirror is a free-form surface.

5. The ultra-thin optical component according to claim 4, wherein the reflective surface is a continuously or non-continuously spliced free-form surface, and satisfies an XY polynomial, and a focal length f of the primary mirror ranges from 15 mm to 25 mm.

6. The ultra-thin optical component according to claim 5, wherein the reflective surface is coated with or attached to a full-reflective film or a reflective film with a predetermined transmission-reflection ratio.

7. The ultra-thin optical component according to claim 6, wherein a non-effective reflective surface of the reflector is extended to an area covering a size of an image source.

8. The ultra-thin optical component according to claim 2, wherein the reflector comprises a primary mirror and an auxiliary mirror, and a reflective surface of the primary mirror is a free-form surface.

9. The ultra-thin optical component according to claim 8, wherein the reflective surface is a continuously or non-continuously spliced free-form surface, and satisfies an XY polynomial, and a focal length f of the primary mirror ranges from 15 mm to 25 mm.

10. The ultra-thin optical component according to claim 9, wherein the reflective surface is coated with or attached to a full-reflective film or a reflective film with a predetermined transmission-reflection ratio.

11. The ultra-thin optical component according to claim 10, wherein a non-effective reflective surface of the reflector is extended to an area covering a size of an image source.

12. The ultra-thin optical component according to claim 11, wherein outer surfaces of the auxiliary mirror and the primary mirror of the reflector are of different types, and a curvature difference between the two outer surfaces is adjusted, to adapt to different visual degrees of human eyes.

13. The ultra-thin optical component according to claim 1, wherein
   the reflector comprises a primary mirror and an auxiliary mirror, and a reflective surface of the primary mirror is a free-form surface.

14. The ultra-thin optical component according to claim 13, wherein the reflective surface is a continuously or non-continuously spliced free-form surface, and satisfies an XY polynomial, and a focal length f of the primary mirror ranges from 15 mm to 25 mm.

15. The ultra-thin optical component according to claim 14, wherein the reflective surface is coated with or attached to a full-reflective film or a reflective film with a predetermined transmission-reflection ratio.

16. The ultra-thin optical component according to claim 15, wherein a non-effective reflective surface of the reflector is extended to an area covering a size of an image source.

17. The ultra-thin optical component according to claim 16, wherein outer surfaces of the auxiliary mirror and the primary mirror of the reflector are of different types, and a curvature difference between the two outer surfaces is adjusted, to adapt to different visual degrees of human eyes.

18. The ultra-thin optical component according to claim 17, wherein the real image is a first refracted image, the image light is refracted through the outer surface of the primary mirror to generate a second refracted image, the second refracted image is reflected off the reflective surface to generate a reflected image, and the reflected image is refracted through the outer image to generate a third refracted image.

19. A display device using the ultra-thin optical component according to claim 1, comprising a micro-image source, wherein the micro-image source is located on an upper portion of the ultra-thin optical component or a side close to the human eye, and is configured to emit the image light, wherein the ultra-thin optical component is configured to refract the received image light symmetrically, then form an inverted image of the image light, and then reflect the image light to the human eye through the reflector; and a display device support, configured to support the micro-image source and the ultra-thin optical component.

20. A virtual imaging method applicable to a near-eye display device, wherein image light emitted by a micro-image source is incident to a mirror reflection device;

the mirror reflection device receives the image light, and refracts the image light directly and symmetrically from the micro-image source to a place between a human eye and an optical element placed right in front of the human eye, to form a real image, the real image and the micro-image source are symmetrical with the mirror projection device as the axis of symmetry; and the aggregated real image is further incident to the optical element, and the optical element may further guide the image light into the human eye.

* * * * *